United States Patent [19]

Imai et al.

[11] Patent Number: 4,975,260

[45] Date of Patent: Dec. 4, 1990

[54] PROCESS FOR PREPARING METAL NITRIDE POWDER

[75] Inventors: Isao Imai, Nagoya; Toshitsugu Ishii, Chita; Kouichi Sueyoshi, Kariya; Toshiyuki Hirao, Aichi, all of Japan

[73] Assignee: Toshiba Ceramics Co., Ltd., Japan

[21] Appl. No.: 333,223

[22] Filed: Apr. 5, 1989

[30] Foreign Application Priority Data

Apr. 18, 1988 [JP] Japan ............................ 63-93500
Feb. 17, 1989 [JP] Japan ............................ 1-37725

[51] Int. Cl.$^5$ .................. C01B 21/06; C01B 21/072; C01B 21/076
[52] U.S. Cl. ................................ 423/412; 423/409; 423/411
[58] Field of Search ................... 423/409, 411, 412

[56] References Cited

U.S. PATENT DOCUMENTS

| | | | |
|---|---|---|---|
| 1,188,770 | 6/1916 | Hershman | 423/412 |
| 3,092,455 | 6/1963 | Paris et al. | 423/412 |
| 3,745,209 | 7/1973 | Middelhoek | 423/409 |
| 3,872,136 | 3/1975 | Middelhoek | 423/409 |
| 4,562,057 | 12/1985 | Goddard et al. | 423/409 |

FOREIGN PATENT DOCUMENTS

| | | | |
|---|---|---|---|
| 82110 | 5/1982 | Japan | 423/411 |
| 77111 | 5/1985 | Japan | 423/412 |
| 176910 | 9/1985 | Japan | 423/412 |
| 8349 | of 1912 | United Kingdom | 423/412 |

*Primary Examiner*—Wayne A. Langel
*Attorney, Agent, or Firm*—Lorusso & Loud

[57] ABSTRACT

Metal nitride powder is prepared by heating a mixture substantially containing powder of a metal oxide or a metal hydroxide in a mixed gas of ammonia gas ($NH_3$) and a hydrocarbon gas ($C_mH_n$) at a temperature ranging from 1300° C. to 1,600° C., in which the mixed gas has a ratio of ammonia gas ($NH_3$) to hydrocarbon gas ($C_mH_n$) translated into $CH_4$, ranging from 10 ($NH_3$) to 1.0 ($CH_4$) to 2,000 ($NH_3$) to 1 ($CH_4$), by volume.

The metal nitride powder contains lesser amounts of oxygen and carbon.

6 Claims, No Drawings

PROCESS FOR PREPARING METAL NITRIDE POWDER

BACKGROUND OF THE INVENTION

1. Title of the Invention

The present invention relates to a process for preparing metal nitride powder.

2. Description of Related Art

Metal nitride powders have been prepared by mixing powder of a metal oxide including $Al_2O_3$, $ZrO_2$ or $TiO_2$ with carbonaceous powder and heating the mixture in a nitrogen atmosphere.

For the conventional process for preparing metal nitride powder, the metal oxide is mixed with the carbonaceous powder in an amount exceeding a stoichiometric amount in order to cause reduction of the metal oxide to a sufficient degree.

However, excess carbonaceous powder should be removed as required. The carbonaceous substance left in a reaction product after the reaction is removed by heating the reaction product at temperatures in the range from 600° C. to 700° C. However, metal nitrides are likely to be oxidized at a relatively low temperature ranging from 600° C. to 700° C. so that, while the amount of oxygen contained in the reaction system would have been reduced during the reaction, the amount of oxygen may be increased at a post-treatment step for removal of carbon, causing the resulting metal nitride to be fully oxidized.

SUMMARY OF THE INVENTION

Therefore, the object of the present invention is to provide a process for preparing metal nitrides using lesser amounts of oxygen and carbon.

The object of the present invention is achieved by a process for preparing metal nitride powder, including the steps of making a mixture substantially containing powder of a metal oxide or a metal hydroxide and heating the mixture in a mixed gas of ammonia gas ($NH_3$) and a hydrocarbon gas (CmHn) at a temperature ranging from 1300° C. to 1,600° C., in which the mixed gas has a ratio of ammonia gas ($NH_3$) to hydrocarbon gas (CmHn), translated into $CH_4$, ranging from 10 ($NH_3$)-to-1.0 ($CH_4$) to 2,000 ($NH_3$)-to-1 ($CH_4$), by volume.

DETAILED DESCRIPTION OF THE PREFERRED EMBODIMENTS

The process according to the present invention involves heating a powder which is substantially metal oxide or metal hydroxide in a mixture of ammonia gas and hydrocarbon gas.

The process will be specifically described with $Al_2O_3$ taken as an example.

Basically, $Al_2O_3$ is reduced and nitrogenated to AlN by the following reaction scheme (1):

$$Al_2O_3 + 2NH_3 \rightarrow AlN + 3H_2O \tag{1}$$

The partial pressure of $H_2O$ generated during the reaction is reduced in accordance with the following reaction (2):

$$mH_2O + CmHn \rightarrow mCO + (m+n/2)H_2 \tag{2}$$

Reduction in the partial pressure of $H_2O$ in accordance with the reaction scheme (2) may smoothly proceed with the reduction of $Al_2O_3$ to AlN in accordance with the reaction scheme (1).

The reaction is carried out at a temperature in the range from 1,300° C. to 1,600° C. and preferably 1,350° C. to 1,600° C. (for the best results 1,400° C. to 1,600° C.) in the mixed gas essentially consisting of ammonia gas ($NH_3$) and hydrocarbon gas (CmHn). If the temperature is lower than 1,300° C., on the one hand, the reaction does not substantially proceed in a desired manner. If the temperature is higher than 1,600° C., on the other hand, thermal decompositon of $NH_3$ may occur to a remarkable extent, thus blocking the reaction in accordance with the scheme (2) and, furthermore, the possibility of production of a carbide as the result of the reaction with the hydrocarbon gas (CmHn) is created.

If the ratio of the ammonia gas ($NH_3$) to the hydrocarbon gas (CmHn), when translated into $CH_4$, is lesser than 10 to 1 (by volume), the partial pressure of $NH_3$ becomes too low, causing the reaction to proceed too slowly. If the ratio is larger than 2,000 to 1 (by volume), the effect of addition of $CH_4$ cannot be obtained. The preferred ratio is from 30 to 100.

The present invention will be further described below by way of examples.

EXAMPLE 1

An alumina boat was filled with 3 grams of aluminium hydroxide, $Al(OH)_3$, as shown in Table 1A below.

Using a tubular furnace equipped with an alumina process tube with an inner diameter of 50 mm, ammonia gas ($NH_3$) is introduced at the rate of 300 liters per hour simultaneously with $C_3H_8$ gas at the rate of 3 liters per hour, causing a turbulence of the mixed gas in the process tube, while the aluminium hydroxide is heated at 1,450° C. for 4 hours.

The resulting product was analyzed to determine its oxygen content and its crystal phase by a well-known X-ray powder analysis method. Table 1B below shows the results of anaylsis.

EXAMPLES 2–6

The procedures followed substantially the same procedure as in Example 1 with the exception that, as a raw material, $Al_2O_3$ was used in Examples 2–4, $TiO_2$ was used in Example 5, and $ZrO_2$ was used in Example 6. The results of the analysis are shown in Table 1B below.

COMPARATIVE EXAMPLES 1–4

The procedures followed substantially the same procedure as Example 1 with the exception that the reaction was carried out under the conditions shown in Table 1A below. The results of the anaylsis are shown in Table 1B below.

TABLE 1A

| | Process Conditions | | | | |
|---|---|---|---|---|---|
| | Raw Material | $NH_3$ Flow Rate (l/hr) | Type of CmHn | CmHn Flow Rate (l/hr) | Heating Temperature (°C.) | Heating Time (hr) |
| Example 1 | $Al(OH)_3$ | 300 | $C_3H_8$ | 3 | 1400 | 4 |

TABLE 1A-continued

| | Process Conditions | | | | | |
|---|---|---|---|---|---|---|
| | Raw Material | $NH_3$ Flow Rate (l/hr) | Type of CmHn | CmHn Flow Rate (l/hr) | Heating Temperature (°C.) | Heating Time (hr) |
| Example 2 | $Al_2O_3$ | 300 | $C_3H_8$ | 3 | 1450 | 4 |
| Example 3 | $Al_2O_3$ | 300 | $CH_4$ | 10 | 1450 | 4 |
| Example 4 | $Al_2O_3$ | 300 | $C_2H_2$ | 6 | 1450 | 4 |
| Example 5 | $TiO_2$ | 300 | $C_3H_8$ | 3 | 1350 | 4 |
| Example 6 | $ZrO_2$ | 300 | $C_3H_8$ | 3 | 1300 | 4 |
| Comparative 1 | $Al_2O_3$ | 300 | $CH_4$ | 0.1 | 1450 | 4 |
| Comparative 2 | $Al_2O_3$ | 300 | $CH_4$ | 700 | 1450 | 4 |
| Comparative 3 | $Al_2O_3$ | 300 | $CH_4$ | 10 | 1700 | 4 |
| Comparative 4 | $Al_2O_3$ | 300 | $CH_4$ | 10 | 750 | 4 |

TABLE 1B

| | Characteristics of the Product Powders | | |
|---|---|---|---|
| | Oxygen Content (wt %) | Carbon Content (wt %) | XRD Identification Phase |
| Example 1 | 2.2 | 0.08 | AlN |
| Example 2 | 2.0 | 0.10 | AlN |
| Example 3 | 1.8 | 0.06 | AlN |
| Example 4 | 1.9 | 0.08 | AlN |
| Example 5 | 2.4 | 0.09 | TiN |
| Example 6 | 2.5 | 0.12 | ZrN |
| Comparative Example 1 | 22.1 | 0.08 | $Al_2O_3$ > AlN |
| Comparative Example 2 | 20.4 | 39.8 | Grap. > $Al_2O_3$ > AlN |
| Comparative Example 3 | 36.7 | 0.03 | $Al_2O_3$ > > AlN |
| Comparative Example 4 | 41.2 | 0.02 | $Al_2O_3$ > > AlN |

As will be apparent from Tables 1A and 1B above, it has been found that the carbon content as well as the oxygen content in the product powder are each within a range from 1.8 to 2.5% by weight in Examples 1 to 6 embodying the present invention.

EXAMPLES 7 to 10 AND COMPARATIVE EXAMPLES 5 to 6

Carbon black having an average particle size of 0.5 microns was mixed with 100 parts by weight of alpha-alumina or aluminium hydroxide powder (when translated into alumina) in the quantities shown in Table 2A below. The mixture was placed in a 10-mm deep dish-like container made from an alumina sintered product, and the container was inserted into a transversely tubular furnace with an alumina process tube having an inner diameter of 100 mm. The mixture was then heated at 1,500° C. for 2 hours while ammonia was supplied to the furnace at the rate of 5 liters per minute, and propane was supplied at the rate of 0.5 liters per minute. The temperature was reduced to 1,200° C. and the supply of propane was stopped. The reaction was continued for an additional 2 hours while ammonia was supplied at the rate of 5 liters per minute. Then the reaction mixture was allowed to cool to room temperature.

The resulting product was measured for its total oxygen and carbon contents. The product (100 grams) was placed in a 2-liter alumina pot together with 1.5 kg of 10 mm-diameter alumina balls and pulverized in a dry manner for 2 hours. Average particle sizes (micro track 50% size) are shown in Tables 2A and 2B below.

The process for preparing metal nitride powder according to the present invention provides a metal nitride powder with a lesser amount of oxygen compared with that of the product of the conventional process.

TABLE 2A

| | Raw Al Material | | | Carbon |
|---|---|---|---|---|
| | Type | Average Particle Size (μm) | Content* (parts by weight) | Content (parts by weight) |
| Example 7 | alpha-$Al_2O_3$ | 0.54 | 100 | 20 |
| Example 8 | alpha-$Al_2O_3$ | 0.54 | 100 | 10 |
| Example 9 | alpha-$Al_2O_3$ | 0.24 | 100 | 20 |
| Example 10 | Al(OH)$_3$ | 1.06 | 100 | 30 |
| Comparative Example 5 | alpha-$Al_2O_3$ | 0.54 | 100 | 0 |
| Comparative Example 6 | alpha-$Al_2O_3$ | 0.54 | 100 | 150 |

*$Al_2O_3$ - translated weight

TABLE 2B

| | Product Powders | | |
|---|---|---|---|
| | Total Oxygen Content (%) | Total Carbon Content (%) | Average Particle Size (μm) |
| Example 7 | 1.50 | 0.02 | 0.86 |
| Example 8 | 1.52 | 0.02 | 0.90 |
| Example 9 | 1.07 | 0.03 | 0.52 |
| Example 10 | 1.18 | 0.03 | 1.28 |
| Comparative Example 5 | 1.53 | 0.03 | 2.95 |
| Comparative Example 6 | 1.40 | 14.6 | Insufficient decarbonization |

The present invention offers the advantage that the reaction can be carried out at a relatively low temperature within the range of 1300° C. to 1,600° C. Furthermore, according to the present invention, the metal nitride powder has a low content of carbon, for example, as low as 0.2% by weight or lower, because no carbonaceous powder is employed as a raw material.

If carbon powder is added in an amount in the range of 0.01 to 0 3 of C/$Al_2O_3$ the alumina particles remain separated by the carbon powder so as to avoid coagulation thereof.

What is claimed is:

1. A process for producing aluminum nitride powder, said process comprising:
    providing a powder consisting essentially of $Al_2O_3$ or Al(OH)$_3$;
    contacting said powder with a gaseous mixture of ammonia and hydrocarbon gas, the $NH_3$/$CH_4$ ratio of said ammonia to said hydrocarbon, expressed as $CH_4$, ranging from 10:1 to 2000:1 by volume; and
    heating said powder in the presence of said gaseous mixture to a temperature of 1300° C. to 1600° C.

2. A process as claimed in claim 1, wherein the ratio of the ammonia gas to the hydrocarbon gas is from 30 to 100.

3. A process as claimed in claim 1, wherein the heating temperature is from 1,350° C. to 1,600° C.

4. A process as claimed in claim 1, wherein the heating temperature is from 1,400° C. to 1,600° C.

5. A process as claimed in claim 1, wherein the powder of the aluminum oxide or the aluminum hydroxide has an average particle size of 2 microns or less.

6. A process for producing an aluminum nitride powder, said process comprising:

mixing (1) a powder of alumina or an alumina precursor convertible to alumina by heating and having a particle size of 2 microns or smaller and (2) a powder of carbon or a carbon precursor convertible to carbon upon heating to produce a reaction mixture having a $C/Al_2O_3$ ratio of 0.01:1 to 0.3:1;

contacting said reaction mixture with a gaseous mixture of ammonia and hydrocarbon gas in a volumetric ratio of hydrocarbon gas to ammonia, expressed as $1/m\ CmHn/NH_3$, of 2 to 0.005; and heating said reaction mixture in the presence of said gaseous mixture to a temperature of 1300° C. to 1600° C. to form aluminum nitride.

\* \* \* \* \*

UNITED STATES PATENT AND TRADEMARK OFFICE
CERTIFICATE OF CORRECTION

PATENT NO. : 4,975,260

DATED : December 4, 1990

INVENTOR(S) : IMAI et al

It is certified that error appears in the above-identified patent and that said Letters Patent is hereby corrected as shown below:

On the title page:

Under the heading "FOREIGN PATENT DOCUMENTS", United Kingdom "8349 of 1912" should read --8349 8/1912--.

Col. 2, line 54, "analysis" should read --analyses--; and line 60, "analysis" should read --analyses--.

Col. 4, line 55, "0 3" should read --0.3--; and line 55, after "C/Al$_2$O$_3$" insert a comma --,--.

Signed and Sealed this

Nineteenth Day of May, 1992

Attest:

DOUGLAS B. COMER

*Attesting Officer*  *Acting Commissioner of Patents and Trademarks*